(12) United States Patent
Yoshino

(10) Patent No.: US 7,810,848 B2
(45) Date of Patent: Oct. 12, 2010

(54) PIPE JOINT AND PIPE JOINT STRUCTURE HAVING THE SAME AND METHOD OF USING THE SAME

(75) Inventor: Makoto Yoshino, Okazaki (JP)

(73) Assignee: Denso Corporation, Kariya (JP)

( * ) Notice: Subject to any disclaimer, the term of this patent is extended or adjusted under 35 U.S.C. 154(b) by 645 days.

(21) Appl. No.: 11/818,564

(22) Filed: Jun. 14, 2007

(65) Prior Publication Data
US 2008/0048447 A1 Feb. 28, 2008

(30) Foreign Application Priority Data
Jun. 15, 2006 (JP) ............................. 2006-166293

(51) Int. Cl.
*F16L 37/00* (2006.01)
(52) U.S. Cl. ..................... 285/305; 285/319
(58) Field of Classification Search ................ 285/319, 285/305, 306, 403
See application file for complete search history.

(56) References Cited

U.S. PATENT DOCUMENTS

| | | | | |
|---|---|---|---|---|
| 3,711,125 A | * | 1/1973 | Dehar | 285/319 |
| 3,826,523 A | * | 7/1974 | Eschbaugh | 285/319 |
| 4,836,580 A | * | 6/1989 | Farrell | 285/319 |
| 4,875,711 A | * | 10/1989 | Watanabe | 285/319 |
| 5,042,844 A | * | 8/1991 | Iida et al. | 285/319 |
| 5,067,754 A | * | 11/1991 | Bartholomew | 285/319 |
| 5,112,084 A | * | 5/1992 | Washizu | 285/319 |
| 5,193,857 A | * | 3/1993 | Kitamura | 285/319 |
| 5,228,724 A | * | 7/1993 | Godeau | 285/319 |
| 5,328,216 A | * | 7/1994 | Miyauchi et al. | 285/319 |
| 5,415,825 A | * | 5/1995 | Sellers | 285/319 |
| 5,429,395 A | * | 7/1995 | Ketcham | 285/319 |
| 5,586,791 A | * | 12/1996 | Kirchner et al. | 285/319 |
| 5,893,589 A | * | 4/1999 | Bleitz et al. | 285/184 |
| 5,947,531 A | * | 9/1999 | Eckard et al. | 285/319 |
| 6,435,567 B2 | * | 8/2002 | Kikumori et al. | 285/319 |
| 6,471,252 B1 | * | 10/2002 | Moretti et al. | 285/319 |
| 6,536,807 B1 | * | 3/2003 | Raymond et al. | 285/319 |
| 6,543,814 B2 | * | 4/2003 | Bartholomew | 285/319 |
| 6,616,195 B2 | * | 9/2003 | Imaeda et al. | 285/319 |
| 6,733,046 B1 | * | 5/2004 | Rief | 285/319 |
| 7,044,506 B2 | * | 5/2006 | Dong | 285/319 |
| 7,178,837 B2 | | 2/2007 | Yoshino | |
| 7,284,774 B2 | * | 10/2007 | Bauer et al. | 285/319 |
| 7,354,078 B2 | * | 4/2008 | Yoshino | 285/319 |

(Continued)

FOREIGN PATENT DOCUMENTS

JP 2-494 1/1990

(Continued)

*Primary Examiner*—David E Bochna
(74) *Attorney, Agent, or Firm*—Harness, Dickey & Pierce, PLC

(57) ABSTRACT

A pipe joint for coupling a first pipe member and a second pipe member has a pipe mounting portion, an elastic displacing portion and an engagement portion. The pipe mounting portion is configured to be attached to one of the first and second pipe members. The elastic displacing portion connects the pipe mounting portion and the engagement portion and allows the engagement portion to displace in a radial direction. The engagement portion has a first contact portion for contacting a first engaged part of the first pipe member and a second contact portion for contacting a second engaged part of the second pipe member.

30 Claims, 9 Drawing Sheets

U.S. PATENT DOCUMENTS

| | | | |
|---|---|---|---|
| 7,611,171 B2 * | 11/2009 | Yoshino | ................ 285/319 |
| 2005/0110274 A1 | 5/2005 | Yoshino | |
| 2006/0220380 A1 | 10/2006 | Yoshino | |

FOREIGN PATENT DOCUMENTS

| | | |
|---|---|---|
| JP | 3-56714 | 12/1991 |
| JP | 6-31669 | 4/1994 |
| JP | 2004-183703 | 7/2004 |

* cited by examiner

PIPE JOINT AND PIPE JOINT STRUCTURE HAVING THE SAME AND METHOD OF USING THE SAME

CROSS REFERENCE TO RELATED APPLICATION

This application is based on Japanese Patent Application No. 2006-166293 filed on Jun. 15, 2006, the disclosure of which is incorporated herein by reference.

FIELD OF THE INVENTION

The present invention relates to a pipe joint for coupling a first pipe member and a second pipe member, a pipe joint structure having the pipe joint, and a method of coupling the first and second pipe members using the pipe joint.

BACKGROUND OF THE INVENTION

A pipe joint structure for coupling a first pipe member and a second pipe member is for example disclosed in Japanese Unexamined Patent Publication No. 2004-183703. The pipe joint structure uses a pipe joint for joining a male joint portion of the first pipe member and a female joint portion of the second pipe member. The pipe joint includes a cylindrical body formed with a pair of slits extending from one end of the cylindrical body in an axial direction. The pair of slits are opposed to each other with respect to an axis of the cylindrical body. Also, the cylindrical body is formed with engaging portions at axial ends thereof. The engaging portions project in a radially inward direction.

The pipe joint is mounted to one of the first and second pipe members, and then the other one of the first and second pipe members is coupled thereto. An axially middle portion of the cylindrical body, between the engaging portions, is thinner than the engaging portions and is deformable to allow displacement of the engaging portion in a radial direction. Thus, the engaging portion is capable of expanding and contracting in the radial direction when coupled to the other one of the first and second pipe members.

In this pipe joint structure, however, in a condition that the first and second pipe members are filled with an internal fluid such as refrigerant, the pipe joint receives a force in a direction to separate the first and second pipe members. It was found that the axially middle portion of the pipe joint particularly receives a compression force due to the internal pressure.

When a modulus of section of the thin axially middle portion reduces, the axially middle portion is likely to cause compression buckling and to be deformed. Further, if the first and second pipe members are affected by a pulling force due to external stress such as vibration of a vehicle, the axially middle portion receives the compression force due to the pulling force. In addition, when the pipe joint is located radially outside of the first and second pipe members, an external form of the coupling portion increases.

SUMMARY OF THE INVENTION

The present invention is made in view of the foregoing matter, and it is an object of the present invention to provide a pipe joint and a pipe joint structure capable of reducing stress to an elastic displacing portion due to internal pressure and external pressure. It is another object of the present invention to provide a compact pipe joint and a pipe joint structure using the same. It is further another object of the present invention to provide a method of coupling pipe members using the pipe joint.

According to an aspect, a pipe joint for connecting a first pipe member and a second pipe member has a pipe mounting portion, an elastic displacing portion extending from the pipe joint and an engagement portion extending from the elastic displacing portion. The pipe mounting portion is configured to be mounted to one of the first pipe member and the second pipe member. The elastic displacing portion is configured to allow the engagement portion to displace with respect to a radial direction of a portion of the second pipe member, which is disposed radially outside of a portion of the first pipe member. The engagement portion has a first contact portion for contacting a first engaged part of the first pipe member and a second contact portion for contacting a second engaged part of the second pipe member.

Accordingly, since the engagement portion has the first and second contact portions, a force caused between the first and second pipe members is received by the engagement portion. Namely, it is less likely that the pipe mounting portion and the elastic displacing portion will receive stress.

According to another aspect, a pipe joint structure has a first pipe member, a second pipe member and a pipe joint for connecting the first and second pipe members. The first pipe member has a first engaged part on its outer periphery. The second pipe member has a pipe main portion and an extension portion extending from an end of the pipe main portion. The extension portion is disposed radially outside of the first pipe member and having a second engaged part. The pipe joint includes a pipe mounting portion, an elastic displacing portion that extends from the pipe mounting portion and an engagement portion that extends from the elastic displacing portion. The pipe mounting portion is mounted to one of the first and second pipe members. The elastic displacing portion supports the engagement portion in a radially inner side of the extension portion of the second pipe member. The engagement portion has a first contact portion contacting the first engaged part of the first pipe member and a second contact portion contacting the second engaged part of the second pipe member.

Accordingly, the pipe joint engages with the first and second engaged parts of the first and second pipe members at the first and second contact portions of the engagement portion. Thus, a force exerted between the first and second pipe members in a direction to separate the first and second pipe members is received by the engagement portion. As such, it is less likely that the pipe mounting portion and the elastic displacing portion will receive stress, such as when an internal pressure increases due to an internal fluid. Also, sine at least the elastic displacing portion and the engagement portion are disposed radially inside of the extension portion of the second pipe member, a size of the pipe joint structure reduces.

According to an aspect of a method of coupling the first pipe member and the second pipe member using the pipe joint, the pipe mounting portion of the pipe joint is mounted to the first pipe member, and the portion of the first pipe member is inserted into the portion of the second pipe member until a tapered outer surface of the first engagement part of the first pipe member is brought into contact with a tapered inner surface of the second pipe member. When the portion of the first pipe member is placed into the portion of the second pipe member, the engagement portion of the pipe joint is displaced in a radially inward direction along a radially inner surface of the portion of the second pipe member, and the engagement portion is entered into the second engaged part of the second pipe member in a radially outward direction due to spring back after the inserting.

Accordingly, the first and second pipe members are coupled through the pipe joint by a one-touch operation.

BRIEF DESCRIPTION OF THE DRAWINGS

Other objects, features and advantages of the present invention will become more apparent from the following detailed description made with reference to the accompanying drawings, in which like parts are designated by like reference numbers and in which.

DETAILED DESCRIPTION OF EXAMPLE EMBODIMENTS

First Embodiment

Figure 1A:
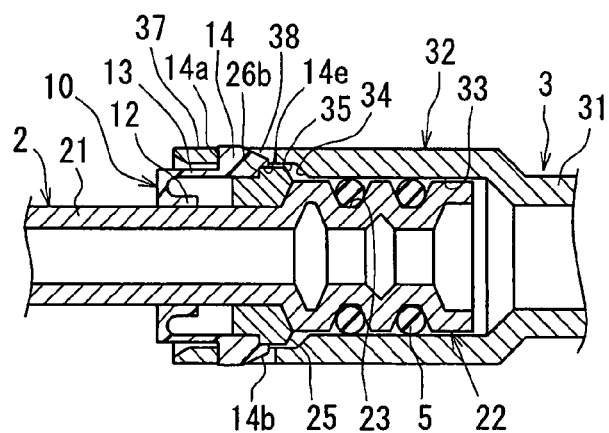
FIG. 1A is a schematic cross-sectional view of a pipe joint structure according to a first embodiment of the present invention.
Figure 1B:
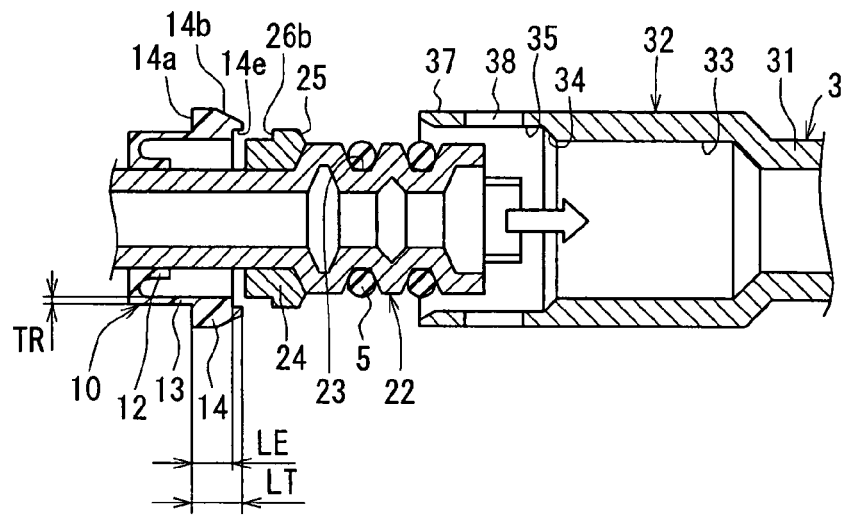
FIG. 1B is an exploded cross-sectional view of the pipe joint structure before a first pipe member and a second pipe member are engaged by a pipe joint according to the first embodiment.
Figure 2:
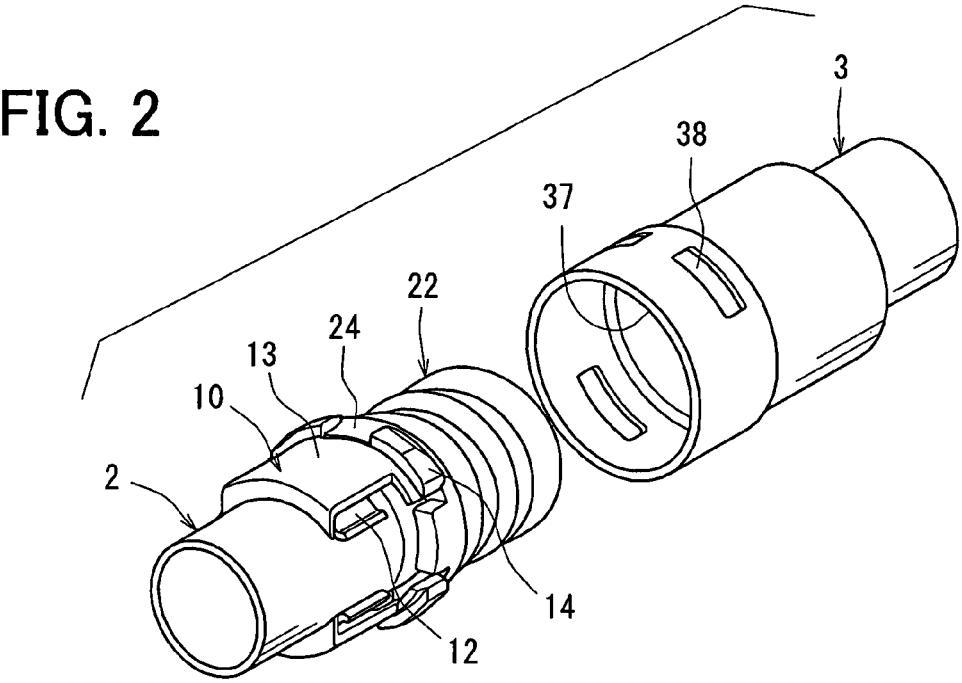
FIG. 2 is an exploded perspective view of a pipe joint structure according to the first embodiment.

A first embodiment of the present invention will now be described with reference to FIGS. 1A to 5C. As shown in FIG. 1A, a pipe joint structure of the first embodiment includes a first pipe member 2, a second pipe member 3 and a pipe joint 10 for coupling the first and second pipe members 2, 3. The first and second pipe members 2, 3 are for example refrigerant pipes of a refrigerant cycle of a vehicle air conditioner or portions of the refrigerant pipes. FIG. 1B shows an exploded cross-sectional view of the pipe joint structure, i.e., a cross-sectional view before the first pipe member 2 is coupled to the second pipe member 3.

The first pipe member 2 has a generally tubular shape for defining a passage therein for allowing a fluid (e.g., refrigerant) to flow. The first pipe member 2 includes a pipe main portion 21 and a male joint 22 at an end of the pipe main portion 21 to be coupled to the second pipe member 3. The male joint 22 has a diameter larger than that of the pipe main portion 21.

The male joint 22 is formed with grooves 23 for receiving sealing members 5 such as rubber O-rings. The grooves 23 are formed from an outer surface of the male joint portion 22 and extend in a circumferential direction in an annular shape.

The first pipe member 2 is provided with a first engaged member (first engaged part) 24. The first engaged member 24 is located on an outer periphery of the end of the pipe main portion 21, the end connecting to the male joint 22. In other words, the first engaged member 24 is located adjacent a base portion of the male joint 22. The first engaged member 24 is a generally cylindrical member.

The first engaged member 24 is provided to engage with first contact portions 14e of engagement portions 14 of the pipe joint 10. In this embodiment, the first engaged member 24 is formed separately from the first pipe member 2, and fixed to the first pipe member 2. For example, the first engaged member 24 is preliminarily arranged on the base portion of the male joint 22 and then a pipe expanding processing is performed to expand from a radial inside, so the first engaged member 24 is integrated with the base portion of the male joint 22.

Figure 4A:
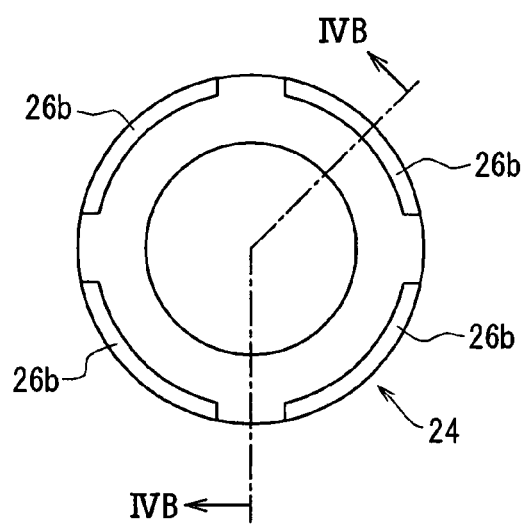
FIG. 4A is an axial end view of a first engaged member of the pipe joint structure according to the first embodiment.
Figure 4B:
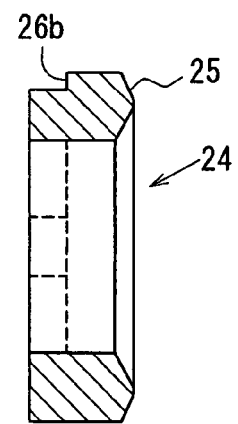
FIG. 4B is a cross-sectional view of the first engaged member taken along a line IVB-IVB in FIG. 4A.

The first engaged member 24 is shown in FIGS. 4A and 4B. The first engaged member 24 has the generally cylindrical shape. The first engaged member 24 has an outer diameter larger than an outer diameter of the pipe main portion 21 of the first pipe member 2. The first engaged member 24 has grooves 26b on its radial outside wall. Each groove 26b extends from a first axial end (left end in FIG. 4B) of the first engaged member 24 and is defined by circumferential surfaces and an axial end surface. Thus, the groove 26b serves as a first engagement surface step portion for engaging with the first contact portion 14e of the engagement portion 14 of the pipe joint 10. The axial end surface of the groove 26b contacts an axial end surface of the first contact portion 14e of the engagement portion 14, as shown in FIG. 1A. The first engaged member 24 has four grooves 26b at predetermined intervals in a circumferential direction thereof, for example.

A width of each groove 26 is substantially equal to a width of the first contact portion 14e of the engagement portion 14 of the pipe joint 10 with respect to the circumferential direction. Thus, when the first contact portions 14e of the engaging portions 14 are engaged with the grooves 26, rotation of the pipe joint 10 relative to the first engagement member 24 in the circumferential direction is restricted. The engagement of the first contact portions 14e and the grooves 26s provides a rotation restricting structure for restricting rotation of the first and second pipe members 2, 3.

For example, the first engaged member 24 is made of metal such as aluminum and iron, and formed by such as forging, die casting, pressing or cutting. Instead, the first engaged member 24 can be made of resin. In the above discussion, the first engaged member 24 is integrated with the first pipe member 2 by expanding (e.g., caulking) the first pipe member 2. However, the first engaged member 24 may be integrated with the first pipe member 2 by other methods. For example, the first engaged member 24 may be press-fitted on the first pipe member 2, or is fixed by such as bonding, welding, or brazing.

The first engaged member 24 has a tapered outer surface 25 on a second axial end (right end in FIG. 1A). The tapered outer surface 25 is configured to make contact with a tapered inner surface 34 of the second pipe member 3.

The second pipe member 3 has a generally tubular shape for defining a passage therein for allowing the fluid to flow. The second pipe member 3 has a pipe main portion 31 and a female joint 32 at an end of the pipe main portion 31. The female joint 32 has a diameter larger than that of the pipe main portion 31.

The female joint 32 has a first portion defining an insertion opening 33 for receiving the male joint 22, an intermediate portion 35 defining the tapered inner surface 34 therein, and a second portion (extension portion) 37 extending from the first portion toward a tip end of the second pipe member 3 through the intermediate portion 35. An inner diameter of the female joint 32 increases from the first portion toward the second portion 37 through the tapered inner surface 34 of the intermediate portion 35. An outer diameter of the second portion 37 is substantially equal to an outer diameter of the intermediate portion 35.

The second portion 37 has second engaged parts 38 for engaging with the engagement portions 14 of the pipe joint 10. For example, the second engaged parts 38 are defined by openings formed at opposite positions with respect to an axis of the female joint 32. In this embodiment, the second portion 37 has four openings 38 to correspond to the engagement portions 14 of the pipe joint 10.

The openings 38 are configured such that the engagement portions 14 of the pipe joint 10 are inserted therein when the tapered outer surface 25 of the first pipe member 2 is brought into contact with the tapered inner surface 34 of the second pipe member 3 while the first pipe member 2 on which the pipe joint 10 is mounted is inserted into the second pipe member 3.

As shown in FIGS. 1A to 3B, the pipe joint 10 is configured to partly mount on the first engaged member 24. For example, the pipe joint 10 is made of resin to allow later-described elastic displacement. Instead, the pipe joint 10 may be made of metal or mixture of metal and resin.

The pipe joint 10 has a generally ring shape to be coaxial with the first and second pipe members 2, 3. As shown in FIG. 1A, the pipe joint 10 is configured to be arranged in a space defined between a radial inner surface of the second portion 37 of the female joint 32 and a radial outer surface of the pipe main portion 21 of the first pipe member 2.

The pipe joint 10 includes a pipe mounting portion 12, elastic displacing portions 13 and the engagement portions 14. The engagement portions 14 extend from an axial end of the elastic displacing portions 13 and are engaged with the first engaged member 24 and the openings 38 as the second engaged parts. The elastic displacing portions 13 have elasticity to allow the engagement portions 14 to elastically displace in the radial direction. The pipe contacting portion 12 is formed to mount on the radial outer surface of the pipe main portion 21 of the first pipe member 2.

Figure 3A:
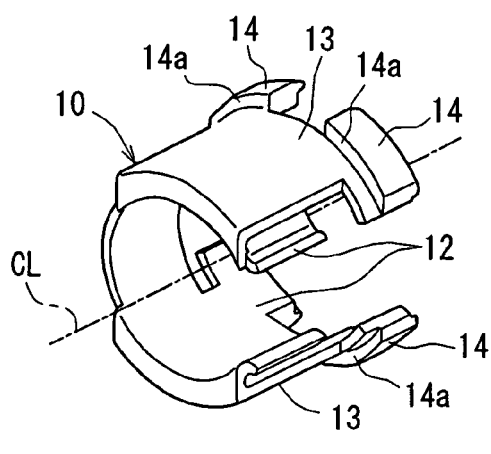
FIGS. 3A and 3B are perspective views of the pipe joint of the pipe joint structure according to the first embodiment.
Figure 3B:
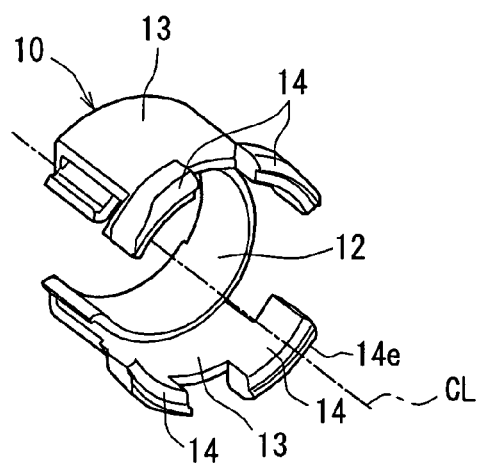

The engagement portions 14 are formed at radially opposite positions with respect to an axis CL, as shown in FIGS. 3A and 3B. For example, four engagement portions 14 are formed. The number of the engagement portions 14 may be modified any numbers according to withstanding resistance to pressure. For example, two of the engagement portions 14, which are opposed in the radial direction, are paired, and a plurality of pairs of the engagement portions 14 is arranged at predetermined intervals in the circumferential direction. Thus, the engagement portions 14 serve as positioning means with respect to the circumferential direction.

Each of the engagement portions 14 has the first contact portion 14e at its end to provide a second engagement surface step portion for engaging with the first engagement surface step portion provided by the grooves 26b of the first engaged member 24. When the first contact portions 14e engages with the grooves 26b of the first engaged member 24, and radially outer portions of the engagement portions 14 are engaged with the openings 38 of the female joint 32, the first and second pipe members 2, 3 are coupled in a condition that the rotation thereof in the circumferential direction is restricted. The engagement portions 14 and the grooves 26b serve as rotation restricting members for the rotation of the first and second pipe members 2, 3.

The engagement portion 14 has a flat axial end surface as a second contact portion 14a on a side opposite to the first contact portion 14e. The second contact portion 14a engages with an axial end surface of the opening 38. As shown in FIG. 1A, in a condition that the first and second pipe members 2, 3 are coupled, when an internal pressure due to the internal fluid is high and the force is exerted in the direction to separate the first and second pipe members 2, 3, the second contact portions 14a are held by the axial end surfaces of the openings 38 in the axial direction. Thus, the engagement portion 14 is engaged with the second portion 37 of the female joint 32.

As shown in FIGS. 3A and 3B, each engagement portion 14 has an arc shape along the circumference of the elastic displacing portion 13. In other words, the engagement portion 14 provides a part of an annular shape. The engagement portion 14 has a generally rectangular shape or a generally trapezoidal shape in a cross-section defined parallel to the axis CL. The engagement portion 14 has a tapered surface 14b on its axial end.

The engagement portion 14 has a radially outer wall and a radially inner wall. An axial end of the radially outer wall is inclined toward the axis CL to provide the tapered surface 14. The radially inner wall of the engagement portion 14 has a stepped portion on its axial end. Thus, the radially inner wall includes a small diameter surface, a large diameter surface and a first partial disc-shaped surface connecting the small diameter surface and the large diameter surface.

Also, the engagement portion 14 has a second partial disc-shaped surface on an axially opposite side as the first partial disc-shaped surface. The second partial disc-shaped surface is perpendicular to the axis CL. Further, the engagement portion 14 has a first circumferential surface and a second circumferential surface opposite to the first circumferential surface in the circumferential direction. The first and second circumferential surfaces are defined on planes that pass through the axis CL.

The first partial disc-shaped surface provides the axial end surface of the first contact portion 14e. The axial end surface of the first contact portion 14e contacts the axial end surface of the groove 26b of the first engaged member 24 to provide an engaged condition between the engagement portion 14 and the first engaged member 24 as the first engaged part.

The second partial disc-shaped surface provides the second contact portion 14a. The second contact portion 14a contacts the axial end surface of the opening 38 of the female joint 32 to provide an engaged condition between the engagement portion 14 and the opening 38 as the second engaged part.

As shown in FIG. 1B, an overall axial length LT of the engagement portion 14 is larger than an axial length LE between the first partial disc-shaped surface and the second partial disc-shaped surface. The engagement portion 14 is formed as a block filled with resin throughout the overall axial length LT. The engagement portions 14 have predetermined strength to resist to the force exerted in the direction to separate the first and second pipe members 2, 3.

As described in the above, the engagement portions 14 are engaged with the first engaged member 24 and the openings 38 as the second engaged part. In other words, the engagement portions 14 are engaged at axially opposite positions.

The engagement portions 14 have the tapered surfaces 14b at the ends thereof. Thus, when the first pipe member 2 is inserted to the second pipe member 3, the engagement portions 14 smoothly enter the second portion 37 of the female joint 32 while being deformed in a radially inward direction along the axial end of the second portion 37. Thus, the pipe joint 10 is smoothly inserted in the second portion 37.

The pipe mounting portion 12 of the pipe joint 10 has a generally thin cylindrical shape and has a slit. Namely, the pipe mounting portion 12 has a substantially C-shape in a cross-section defined perpendicular to the axis CL. The pipe mounting portion 12 has elasticity. Thus, the pipe joint 10 is mounted to the first pipe member 2 from the radially outside of the first pipe member 2 by expanding the C-shaped pipe mounting portion 12 in the radial direction. In other words, the pipe mounting portion 12 is mounted to the first pipe member 2 through the slit.

The elastic displacing portions 13 connect an axial end of the pipe mounting portion 12 and the engagement portions 14. Also, the elastic displacing portions 13 are formed to allow the engagement portions 14 to elastically displace in the radial direction. For example, the elastic displacing portions 13 extend from the axial end of the pipe mounting portion 12 in a radially outward direction and then extend in the axial direction to overlap with a radially outer surface of the pipe mounting portion 12 with clearances. Further, the elastic displacing portions 13 connects to the engagement portions 14. Thus, the pipe mounting portion 12 and the elastic displacing portions 13 form a substantially U-shape in an axial cross-section shown in FIG. 1. Also, each of the elastic displacing portions 13 has an arc shape along the circumferential direction to provide a portion of a ring shape.

As shown in FIG. 1B, a radial thickness TR of an axially extending portion of the elastic displacing portion 13 with respect to the radial direction is sufficiently smaller than the axial length LE, LT of the engagement portions 14. Also, the radial thickness TR is smaller than the radial thickness of the engagement portions 14. Therefore, even when the elastic displacing portions 13 and the engagement portions 14 are made of the same resin material, the elastic displacing portions 13 provide sufficient flexibility in the radial direction. Accordingly, the engagement portions 14 are elastically displaceable in the radial direction.

In this embodiment, two elastic displacing portions 13 are formed at opposite positions with respect to the axis CL. Two engagement portions 14 extend from opposite circumferential ends of the axial end of each elastic displacing portion 13. Thus, the pipe joint 10 has four engagement portions 14 in the circumferential direction. The openings 38 of the second pipe member 3 are formed at four locations corresponding to the four engagement portions 14. In other words, the openings 38 are formed at locations to oppose with respect to the axis of the second portion 37.

Here, the number of the elastic displacing portions 13 and the engagement portion 14 are not limited to two and four, respectively. For example, three or more engagement portions 14 may be formed to each of the elastic displacing portions 13 at equal intervals with respect to the axis. Further, each of the elastic displacing portions 13 may be formed with a slit extending in the axial direction at a circumferentially middle position thereof such that the elastic displacing portion 13 is separated into two pieces. In this case, the engagement portions 14 may be formed to extend from the respective pieces of the elastic displacing portion 13.

In the condition that the first and second pipe members 2, 3 are coupled and filled with the fluid, when the internal pressure is high, the force is applied in the direction to separate the first and second pipe members 2, 3. In this condition, therefore, the engagement portions 14 will be exerted by a compression force due to the internal pressure.

In this embodiment, the thickness of the engagement portions 14 is increased in the radial direction, e.g., greater than the thickness of the pipe mounting portion 12 and the elastic displacing portions 13 so as to improve rigidity in the cross-section. Therefore, compression buckling and deformation of the engagement portions 14 are reduced. When the pipe joint 10 is integrally molded with the resin material, it is preferable to add a reinforcement filler such as glass and talc to the resin material so as to improve the rigidity of the engagement portions 14.

The force in the direction to separate the first and second pipe members 2, 3 is received by the engagements of the first and second contact portions 14e, 14a of the engagement portions 14 with the grooves 26b and the openings 38b, respectively. Therefore, it is less likely that the pipe mounting portions 12 and the elastic displacing portions 13 will affected by the force due to the internal pressure. Therefore, the thickness of the pipe mounting portion 12 and the elastic displacing portions is reduced.

Figure 5A:
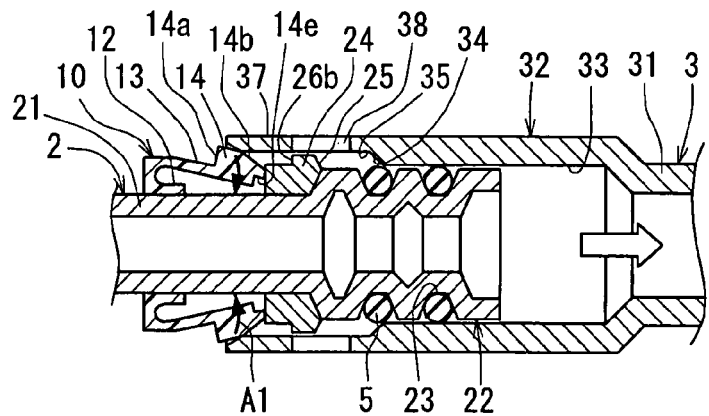
FIG. 5A is a cross-sectional view of the pipe joint structure while a male joint of the first pipe member is inserted in a female joint of the second pipe member according to the first embodiment.
Figure 5B:
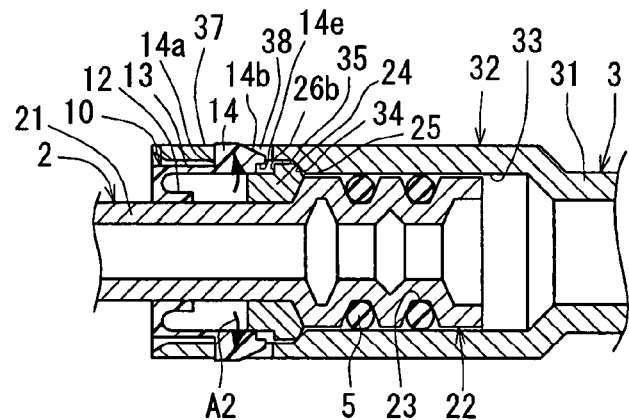
FIG. 5B is a cross-sectional view of the pipe joint structure just before engagement by the pipe joint according to the first embodiment.
Figure 5C:
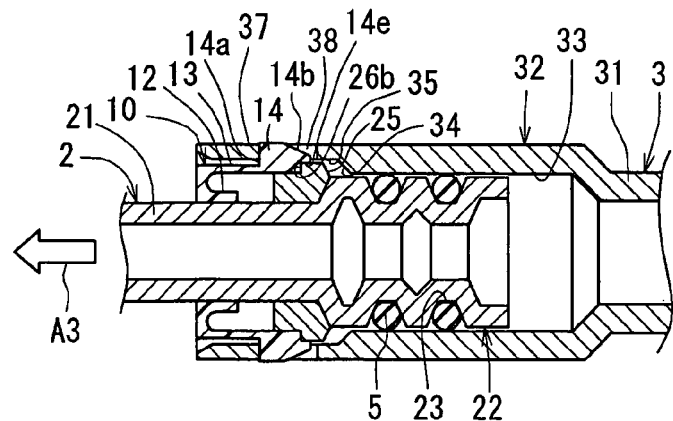
FIG. 5C is a cross-sectional view of the pipe joint structure after the engagement or in a condition filled with a fluid according to the first embodiment.

Next, a method of assembling the pipe joint structure will be described with reference to FIG. 1B, 5A to 5C. FIG. 1B shows a condition before the first and second pipe members 2, 3 are coupled. FIG. 5A shows a condition while the male joint 22, the first engaged member 24 and the pipe joint 10 are being inserted in the female joint 32. FIG. 5B shows a condition right before the engagement portions 14 are engaged. FIG. 5C shows a condition after the engagement and filled with the fluid.

First, as shown in FIG. 1B, the pipe joint 10 is mounted to the first pipe member 2 by opening the slit of the C-shaped pipe mounting portion 12. The male joint 22 coaxially aligned with the second portion 37 of the female joint 32.

Then, as shown in FIG. 5A, the male joint 22 is inserted into the second portion 37, and further into the insertion opening 33 of the first portion of the female joint 32. At this time, the tapered surfaces 14b of the engagement portions 14 are pressed by the end of the second portion 37 of the female joint 32. Thus, the engagement portions 14 are displaced in the radially inward direction, as shown by arrows A1. As such, the engagement portions 14 are inserted into the second portion 37 of the female joint 32.

As shown in FIG. 5B, the first pipe member 2 is further inserted into the second pipe member 3 until the tapered outer surface 25 of the first engaged member 24 is brought into contact with the tapered inner surface 34 of the second pipe member 3. When the tapered outer surface 25 of the first engaged member 24 contacts the tapered inner surface 34 of the second pipe member 3, the engaged portions 14 are received in the openings 38 due to spring back thereof, as shown by arrows A2.

Next, the first pipe member 2 is pulled in a direction opposite to the second pipe member 3 (i.e., in a leftward direction in FIG. 5C). Thus, as shown in FIG. 5C, the radially inner surface of the engagement portions 14 slide over the grooves 26b of the first engagement member 24 and the axial end surface of the first contact portions 14e are engaged with the axial end surfaces of the grooves 26.

With this, the second contact portions 14a of the engagement portions 14 are engaged with the axial end surfaces of the opening 38 of the female joint 32. Thus, the first and second pipe members 2, 3 are restricted in the axial direction. Accordingly, the first and second pipe members 2, 3 are coupled by a one-tough simple operation.

Also, when the first and second pipe members 2, 3 are filled with the fluid and the internal pressure increases, the first pipe member 2 is likely to move in the axially opposite direction to the second pipe member 3, as shown by an arrow A3 in FIG. 5C. At this time, the axial end surface of the grooves 26b are received by the axial end surfaces of the first contact portions 14e and further the second contact portions 14a are received by the axial end surfaces of the openings 38. Thus, the separation of the first and second pipe members 2, 3 is restricted by the axial engagement of the first and second contact portions 14e, 14a. Namely, in a condition that the fluid is not filled in the first and second pipe members 2, 3, the first contact portions 14e are engaged with the grooves 26b by moving the first pipe member 2 away from the second pipe member 3.

In the condition that the first and second contact portions 14e, 14a are engaged with the axial end surfaces of the grooves 26b and the openings 38 in the axial direction as shown in FIG. 5C, radially inward movement of the engagement portions 14 are restricted. That is, in the condition shown in FIG. 5C, radially inner portions of the engagement portions 14 are received in the grooves 26b in the radially inward direction. Therefore, even when the engagement portions 14 are pressed from the outside of the openings 38, the engagement portions 14 are not removed from the openings 38. Accordingly, the first and second pipe members 2, 3 are not separated from each other.

To separate the first pipe member 2 from the second pipe member 3, the first pipe member 2 is pressed toward the second pipe member 3 once such that the first contact portions 14e are disengaged from the grooves 26b. Then, the engagement portions 14 are pressed in the radially inward direction from the outside of the openings 38.

Also, if the first and second pipe members 2, 3 are forcibly separated in a condition that the internal pressure is still high, the fluid will be spurted out. Therefore, it is preferable to separate the first and second pipe members 2, 3 after the internal pressure is reduced.

In the above discussed pipe joint structure shown in FIGS. 1 and 5C, the engagement portions 14 are engaged with the grooves 26b of the first engaged member 24 of the first pipe member 2 and the openings 38 of the second pipe member 3. Thus, the pipe joint 10 restricts the rotation of the first and second pipe members 2, 3. That is, the radially inner portions of the engagement portions 14 are received in the grooves 26b and the radially outer portions of the engagement portions 14 are received in the openings 38. The engagement portions 14 are engaged with the first engaged member 24 of the first pipe member 2 and the second engaged parts 38 of the second pipe member 3 in the circumferential direction.

Further, the engagement portions 14 are engaged with the first engaged member 24 and the openings 38 in the axial direction. Thus, the engagement portions 14 restricts axial movements of the first and second pipe members 2, 3. As such, the engagement portions 14 provides both of the rotation restricting means and coupling condition maintaining means for restricting separation of the first and second pipe members 2, 3.

Since the rotation between the first and second pipes 2, 3 is restricted, problems such as interference with peripheral components or devices, wear of sealing parts, leakage of the fluid due to vibration of a vehicle, are reduced even when mounted on a vehicle.

In this embodiment, the male joint 22 has two grooves 23 for receiving the O-rings 5. However, the numbers of grooves 23 and O-rings 5 may be modified. Also, the sealing members are not limited to the rubber O-rings 5. For example, the sealing members may be provided by metal sealing members, resin sealing members, or the like.

Since the pipe joint 10 is formed to be attachable between the second portion 37 of the second pipe member 3 and the first pipe member 2, the external form of the pipe joint 10 is substantially similar to the form of the second portion 37 of the second pipe member 3. Also, since the pipe joint 10 is disposed in the space defined between the second portion 37 of the second pipe member 3 and the pipe main portion 21 of the first pipe member 2, the size of the pipe joint structure reduces in the radial direction.

Also, in a condition of use, the first contact portions 14e and the second contact portions 14a of the engagement portions 14 contact the first engaged member 24 and the axial end surface of the openings 38, respectively, in the axial direction. Thus, the force caused by the internal pressure due to the fluid in the direction to separate the first and second pipe members 2, 3 is received only by the engagement portions 14. Accordingly, it is less likely that the pipe mounting portion 12 and the elastic displacing portions 13 of the pipe joint 10 will be affected by the force due to the fluid. Thus, the thickness of the pipe mounting portion 12 and elastic displacing portions 13 is reduced.

The pipe mounting portion 12 has the slit on its side and is a substantially C-shape. Also, the pipe mounting portion 12 has elasticity. Therefore, the pipe joint 10 is easily mounted to the first pipe member 2 from the radially outside by opening the pipe mounting portion 12 at the slit.

Also, the engagement portions 14 have modulus of elasticity greater than that of the pipe mounting portion 12 and the elastic displacing portions 13. Thus, the strength of engagement portions 14, which receives the force due to the internal pressure, improves.

Further, the radial thickness of the engagement portions 14 is greater than that of the pipe mounting portion 12 and the axially extending portion of the elastic displacing portions 13. Thus, the strength of the engagement portions 14 further improves. Since the pipe mounting portion 12 and the elastic displacing portions 13 overlap with each other, the pipe joint 10 is compact. Further, since the engagement portions 14 extend from the axial ends of the elastic displacing portions 13, the diameter of the pipe joint 10 reduces.

When the first and second pipe members 2, 3 are filled with the fluid and the internal pressure increases, the engagement portions 14 move in the axial direction along the grooves 26b and engaged with the openings 38. In this condition, the radially inner portion of the engagement portions 14 are received in the grooves 26b. In other words, the engagement portions 14 are locked by the grooves 26b of the first engaged member 24 in the radially inward direction. Therefore, in the condition that the internal pressure is high, it is difficult to detach the first and second pipe members 2, 3. Accordingly, the spur of the internal fluid is reduced during the detachment of the first and second pipes 2, 3.

Also, the first engagement member 24 is formed separately from the first pipe member 2 and then integrated with the first pipe member 2. Therefore, the first engagement member 24 is formed easily and in reduced cost.

Second Embodiment

A second embodiment will be described with reference to FIGS. 6A to 6C. The shape of the pipe joint 10 can be modified such that the pipe mounting portion 12, the elastic displacing portions 13 and the engagement portions 14 are aligned in the axial direction, as shown in FIGS. 6A to 6C.

Figure 6A:
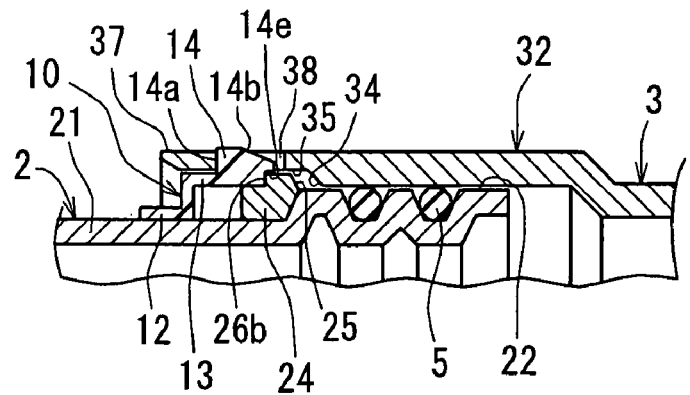
FIGS. 6A and 6B are cross-sectional views of a pipe joint structure according to a second embodiment of the present invention.
Figure 6B:
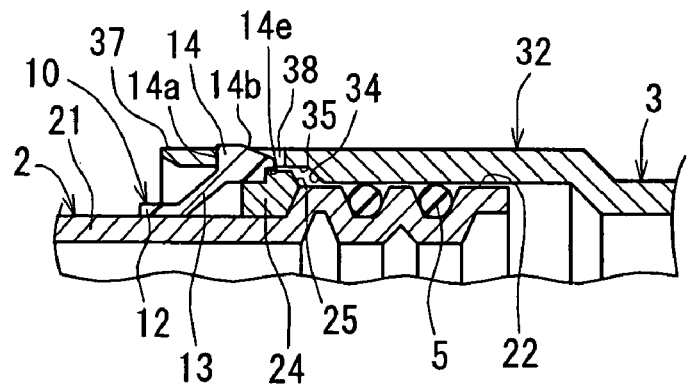
Figure 6C:
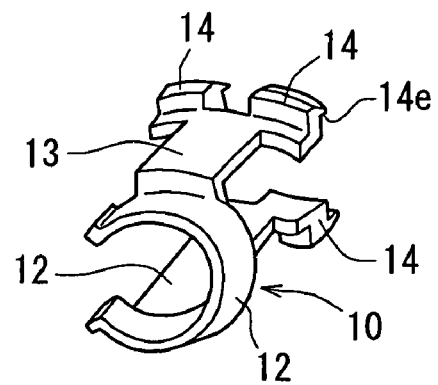
FIG. 6C is a perspective view of a pipe joint of the pipe joint structure according to the second embodiment.

In the example shown in FIGS. 6A and 6C, the elastic displacing portions 13 extend from the axial end of the pipe mounting portion in the radially outward direction and further extend in the axial direction. The engagement portions 14 extend from the axial ends of the elastic displacing portions 13 on the axial direction. In the elastic displacing portions 13, portions extending in the axial direction define a right angle relative to and portions extending in the radially outward direction. Also, the pipe mounting portion 12 and the elastic displacing portions 13 do not overlap with each other.

Also in this case, the elastic displacing portions 13 have arc shapes and are formed at position opposite to each other with respect to the axis. The engagement portions 14 extend from circumferential ends of the axial end of each elastic displacing portion 13.

As such, the pipe joint 10 has an external form similar to that of the second portion 37 of the female joint 32. Also, the elastic displacing portions 13 support the engagement portions 14 such that the engagement portions 14 are displaceable in the radial direction.

In the example shown in FIG. 6B, the elastic displacing portions 13 are formed to connect the pipe mounting portion 12 and the engagement portions 14 obliquely with respect to the axis.

Also in the second embodiment, the effects similar to the first embodiment will be provided.

Third Embodiment

A third embodiment will be described with reference to FIGS. 7A and 7B. In the third embodiment, the pipe joint 10 has the different shape as those of the first and second embodiments.

Figure 7A:
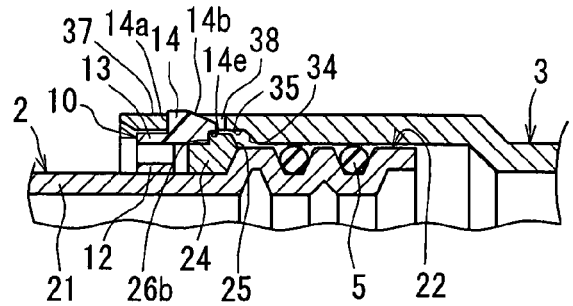
FIG. 7A is a cross-sectional view of a pipe joint structure according to a third embodiment of the present invention.
Figure 7B:
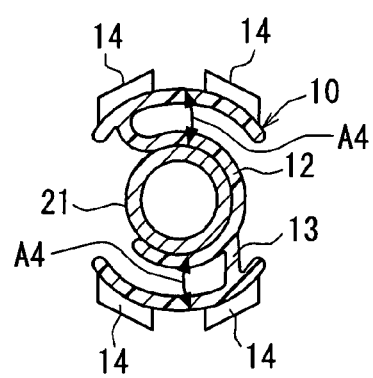
FIG. 7B is a cross-sectional view of a pipe joint and a first pipe member of the pipe joint structure according to the third embodiment.

As shown in FIGS. 7A and 7B, the pipe mounting portion 12 has a substantially C-shaped cross-section. The elastic displacing portions 13 extend from the pipe mounting portion 12 in a radially outward direction to form substantially S-shaped cross-sections with the pipe mounting portion 12. Thus, the elastic displacing portions 13 include arc shaped portions and radially extending portions connecting the arc shaped portions and the pipe mounting portion 12. The arc shaped portions overlap with the pipe mounting portion 12 through clearances. The engagement portions 14 extend from the arc shaped portions of the elastic displacing portions 13 in the axial direction.

The arc shaped portions are formed at opposite positions with respect to the axis. The arc shaped portions are elastically deformable to allow the elastic displacement of the engagement portions 14 in the radial direction as shown by arrows A4.

Accordingly, the pipe joint 10 has an external form substantially similar to that of the second portion 37 of the second pipe member 3. Also, the engagement portions 14 are displaceable in the radial direction. As such, in the third embodiment, the effects similar to the first embodiment will be provided.

Fourth Embodiment

A fourth embodiment will be described with reference to FIG. 8. In this embodiment, the first pipe member 2 has positioning means for positioning the pipe joint 10.

Figure 8:
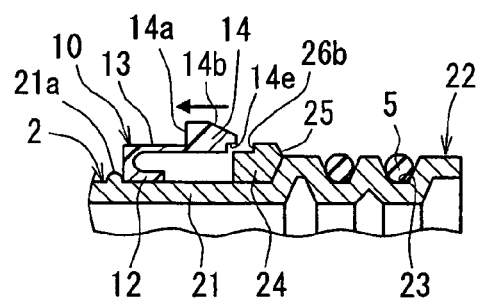
FIG. 8 is a cross-sectional view of a pipe joint structure in which a second pipe member is separated, according to a fourth embodiment of the present invention.

As shown in FIG. 8, the first pipe member 2 has a stopper portion 21 in a form of projection at a predetermined position on its outer peripheral surface. The pipe joint 10 is mounted on the first pipe member 2 such that an axial end of the pipe mounting portion 12 is received by the stopper portion 21.

The stopper portion 21 is formed at a predetermined position so that tip ends of the engagement portions 14 contact the axial end of the first engaged member 24. Namely, the stopper portion 21 is located such that the first contact portions 14e are separated from an axial end face of the first engagement member 24 in the axial direction.

The stopper portion 21 for positioning the pipe joint 10 with respect to the first pipe member 2 is not limited to the above, but may be modified in other ways. For example, a recess may be formed on the pipe main portion 21 of the first pipe member 2 and a projection is formed on the pipe mounting portion 12 of the pipe joint 10 to be received in the recess of the pipe main portion 21. Also, the stopper portion 21 may be entirely or partly formed on the circumference of the first pipe member 2.

As such, when the tapered surfaces 14b of the engagement portions 14 are pressed by the end of the second portion 37 while the first pipe member 2 is inserted into the second pipe member 3, it is less likely that the pipe joint 10 will be displaced in a direction away from the first engaged member 24, as shown by an arrow in FIG. 8. Thus, the engagement portions 14 are smoothly inserted into the second portion 37 of the second pipe member 3.

Fifth Embodiment

Figure 9:
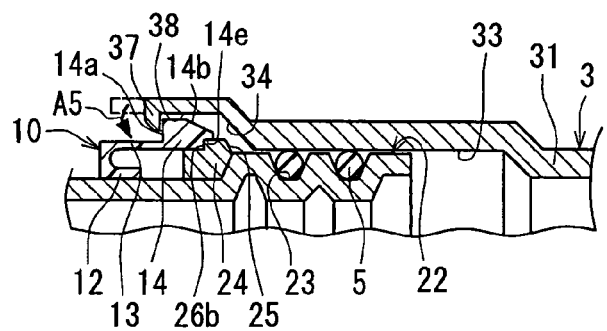
FIG. 9 is a cross-sectional view of a pipe joint structure according to a fifth embodiment of the present invention.

A fifth embodiment will be described with reference to FIG. 9. In the above embodiments, the second engaged parts 38 of the female joint 32 is provide by the openings. In the fifth embodiment, instead of the openings, the second engaged parts 38 are provided by radially inner stepped portions 38a, as shown in FIG. 9.

For example, the second portion 37 of the female joint 32 is partly expanded in the radially outward direction to provide grooves on the radially inner surface of the second portion 37 at positions corresponding to the engagement portions 14. The radially inner stepped portions are provided by the grooves.

Further, the axial end of the second portion 37 is bent in the radially inward direction, as shown by an arrow A5, at positions corresponding to the grooves in the circumferential direction, such as by plastic forming. As such, the axial end of each of the radially inner stepped portion contacts the second contact portion 14a of the engagement portion 14.

When the tapered outer surfaces 25 of the first engaged member 24 contacts the tapered inner surface 34 of the intermediate portion 35 while the first pipe member 2 is inserted into the second pipe member 3, the radially outer portions of the engagement portions 14 are received in the radially inner stepped portions 38. Since the second engaged portions are formed on the radially inner side of the second portion 37 of the female joint 32, an outer diameter of the second portion 37 is larger than an outer diameter of the first portion of the female joint 32.

Accordingly, the second engaged portions are integrally formed with the second pipe member 3. Also in this case, the effects similar to the above embodiments will be provided.

In the above discussion, the radially inner stepped portions 38 are partly formed on the radially inner side of the second portion 37. Alternatively, a groove for receiving the engagement portions 14 may be formed on the radially inner side of the second portion 37 entirely in the circumferential direction.

Sixth Embodiment

A sixth embodiment will be described with reference to FIG. 10. In the sixth embodiment, the pipe joint 10 is mounted to the second portion 37 of the second pipe member 3, as shown in FIG. 10.

The pipe joint 10 has a substantially ring shape and is capable of being generally arranged in the space defined between the pipe main portion 21 of the first pipe member 2 and the second portion 37 of the second pipe member 3. The pipe mounting portion 12 has a ring shape and includes an axially extending portion extending in the axial direction along a radially outer surface of the second portion 37 and a radially extending portion extending in a radially inward direction from an end of the axially extending portion. The elastic displacing portions extend from a radially inner end of the radially extending portion of the pipe mounting portion 12 in the same direction as the axially extending portion of the pipe mounting portion 12.

Figure 10:
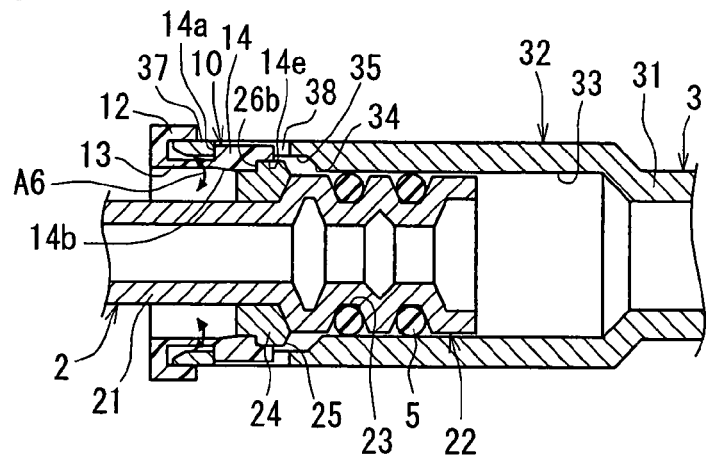
FIG. 10 is a cross-sectional view of a pipe joint structure according to a sixth embodiment of the present invention.

In other words, the pipe mounting portion 12 and the elastic displacing portions 13 form a U-shaped cross-section, as shown in FIG. 10. The pipe mounting portion 12 and the elastic displacing portions 13 cover the axial end of the second portion 37 as in the form of cap. The elastic displacing portions 13 have the arc shape, similar to the above embodiments.

The engagement portions 14 extend from the axial ends of the elastic displacing portions 13. The engagement portions 14 are opposite to each other with respect to the axis CL of the pipe joint 10. Also, each of the engagement portion 14 has an arc shape in a cross-section defined in a direction perpendicular to the axis CL. The engagement portions 14 has the first and second contact portions 14e, 14a at axially opposite ends thereof to engage with the axial end surfaces of the groove 26b and the openings 38.

In this case, the tapered surfaces 14b are formed on the radially inner sides of base portions of the engagement portions 14, the base portions extending from the elastic displacing portions 13.

To couple the first and second pipe members 2, 3, for example, the pipe joint 10 is first mounted to the second portion 37 of the female joint 32. Then, the male joint 22 of the first pipe member 2 is inserted into the female joint 32 of the second pipe member 3. At this time, the tapered surfaces 14b of the engagement portions 14 are pressed by the tapered outer surfaces 25 of the first engaged member 24 in the radially outward direction, as shown by arrows A6. Thus, the radially outer portions of the engagement portions 14 are received in the openings 38 and the radially inner portions of the engagement portions 14 are received in the grooves 26b of the first engaged member 24.

Also in this case, the engagement portions 14 engage with the first engaged member 24 and the openings 38 at the first and second contact portions 14e, 14a, respectively. Accordingly, the first and second pipe members 2, 3 are coupled and engaged through the pipe joint 10 by the one touch operation.

Accordingly, the pipe joint 10 can be mainly arranged radially inside of the second portion 37 of the female joint 32. Thus, the external form of the coupling portion reduces.

Further, the first and second contact portions 14e, 14a of the engagement portions 14 are engaged with the first engaged member 24 and the openings 38 in the axial direction, similar to the first embodiment. The pipe mounting portion 12 and the elastic displacing portions 13 are arranged at location other than the openings 38. Thus, even when the internal pressure increases and the force is exerted in the direction to separate the first and second pipe members 2, 3, the force is received by the engagements at the first and second contact portions 14e, 14a. Namely, the force due to the internal pressure is received by the engagement portions 14, and it is less likely that the pipe mounting portion 12 and the elastic displacing portions 13 will be affected by the force due to the internal pressure. Thus, the effects similar to the above embodiments will be provided.

Seventh Embodiment

A seventh embodiment will be described with reference to FIGS. 11A, 11B and 12. In the above embodiments, the first engaged member 24 is formed separately from the first pipe member 2 and then fixed to the first pipe member 2. In the seventh embodiment, the first engaged member 24 is integrally formed with the first pipe member 2, as shown in FIG. 11A.

Specifically, an expansion is formed on a radially outer side of the base portion of the male joint 22 as the first engaged part 24. The expansion 24 has an outer diameter larger than the outer diameter of the male joint 22. The expansion 24 has the tapered outer surface 25 such that the outer diameter reduces toward the male joint 22. Further, the expansion 24 has an engagement surface 26 on a side opposite to the tapered outer surface 25 in the axial direction to engage with the first contact portion 14e of the pipe joint 10. Also in this case, the effects similar to the above embodiments will be provided.

In the above embodiments, the structure for restricting the rotation of the first and second pipe members 2, 3 is provided by the engagement of the engagement portions 14 with the grooves 26b of the first engaged member 24 and the openings 38 as the second engaged parts. However, the rotation restricting structure can be provided by other ways.

Figure 11A:
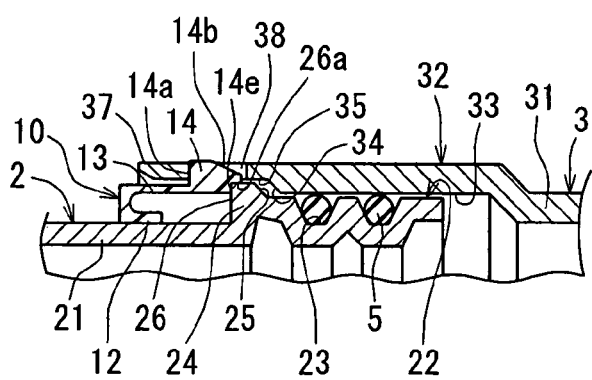
FIGS. 11A and 11B are cross-sectional views of a pipe joint structure according to a seventh embodiment of the present invention.
Figure 11B:
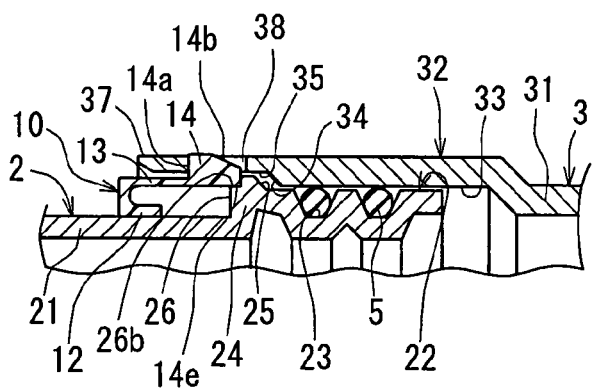
Figure 12A:
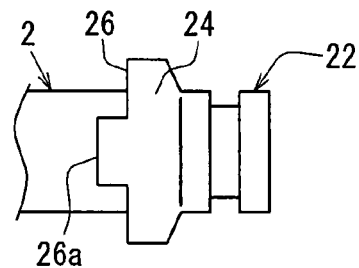
FIG. 12A is a side view of a first pipe member with a first engaged part for the pipe joint structure according to a seventh embodiment of the present invention.

For example, in FIG. 11A, the first contact portion 14e of the engagement portion 14 has the recess. The expansion 24 has a projected portion or cornered end 26a as the first engagement surface step portion to be engaged with the recess of the first contact portion 14e. In FIG. 11B, the first contact portion 14e of the engagement portion 14 has a projected portion or cornered end, and the expansion 24 has the groove or recess 26b as the first engagement surface step portion to engage with the projected portion of the first contact portion 14e. The engagement structures of FIGS. 11A and 11B are alternately formed at predetermined intervals in the circumferential direction. Therefore, the rotation of the first and second pipe members 2, 3 is restricted. FIG. 12A shows an example of the expansion 24 on which the projected portions 26a and the recesses 26b are formed alternately in the circumferential direction.

The projected portions 26a and the grooves 26b are formed merely by adding one step in forming and processing the expansion 24. Therefore, in this embodiment, the manufacturing costs reduce, as compared in the case where the first engaged member 24 is formed separately.

Eighth Embodiment

An eighth embodiment will be described with reference to FIGS. 12B to 12E. In the seventh embodiment, the expansion 24 as the first engaged part is integrally formed on the first pipe member 2 and the projected portions 26a and the grooves 26b are formed as shown in FIG. 12A. However, the shape of the first engagement surface step portion is not limited to the above, but may be modified in various ways. FIGS. 12B to 12E show examples of the shapes of the first engagement surface step portion.

The engagement surface step portion provides stepped surfaces facing in the circumferential direction of the first pipe member 2. Further, the engagement surface step portion can be provided by surfaces that form projections and recesses in the axial direction of the first pipe member 2. Moreover, the engagement surface step portion can be provided by surfaces that form projections and recesses in the radial direction of the first pipe member 2.

Figure 12B:
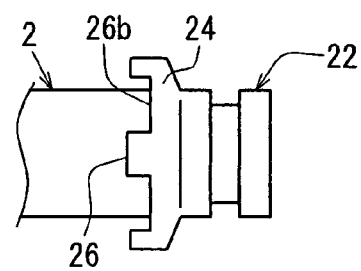
FIGS. 12B to 12E are side views of a first pipe member with a first engaged member for a pipe joint structure according to an eighth embodiment of the present invention.

In the example shown in FIG. 12B, the engagement surface step portion is provided by forming the edge of the expansion 24 in a rectangular wave form. Specifically, four grooves 26b are formed at predetermined equal intervals in the circumferential direction of the engagement surface 26 of the expansion 24, as the engagement surface step portion. In this case, the engagement portions 14 have the first contact portions 14e in the form of projection to correspond to the grooves 26b.

Figure 12C:
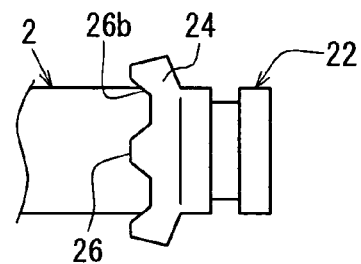

In the example shown in FIG. 12C, the engagement surface step portion is provided by forming the edge of the expansion 24 in a trapezoidal wave form. Specifically, the four grooves 26b in the form of trapezoid are formed at predetermined equal intervals in the circumferential direction of the engagement surface 26 of the expansion 24. In this case, the engagement portions 14 have the first contact portions 14e in the form of trapezoid to correspond to the trapezoidal-shaped grooves 26b.

Figure 12D:
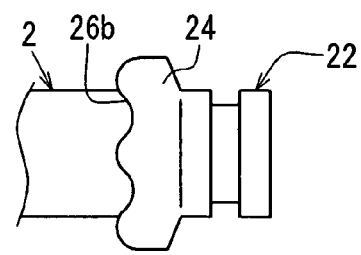

In the example shown in FIG. 12D, the engagement surface step portion is provided by forming the edge of the expansion 24 in smooth wave form. Specifically, the grooves 26b in the form of smooth wave are formed at predetermined equal intervals in the circumferential direction of the engagement surface 26 of the expansion 24. In this case, the first contact portions 14e have smooth wave forms to correspond to the smooth wave-formed grooves 26b.

Figure 12E:
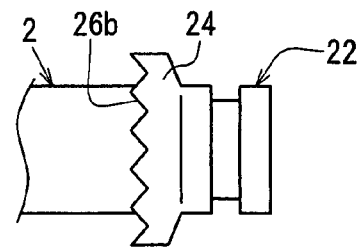

In the example shown in FIG. 12E, the engagement surface step portion is provided by forming the edge of the expansion 24 in V-shaped wave form. Specifically, V-shaped grooves 26b are formed at predetermined equal intervals in the circumferential direction of the engagement surface 26. In this case, the first contact portions 14e have V-shaped wave forms to correspond to the grooves 26b in the form of V-shaped wave.

Furthermore, the engagement surface 26 can be provided by a rough surface having high frictional resistance. In this case, the engagement portions 14 also have rough surfaces. The engagement structures shown in FIGS. 12A to 12E may be also employed to the first engaged member 24 of the first to sixth embodiments.

Ninth Embodiment

A ninth embodiment will be described with reference to FIGS. 13A to 13E. In the above embodiments, the rotation restricting structure for restricting the rotation of the first and second pipe members 2, 3 is provided by engagement of the radially inner portions of the engagement portions 14 of the pipe joint 10 and the grooves 26b. However, the rotation restricting structure may be provided by other ways.

In the above embodiments, the first engaged member/part 24 and the engagement portions 14 have the substantially cylindrical shape (circular shape). Namely, the radial outer surfaces (bottom surfaces) of the grooves 26b are defined on a circle, as shown in FIG. 4A. With this, the radially inner surfaces of the engagement portions 14 have an arc shape along the circle. However, the shapes of the first engaged members/parts 24 can be modified.

Figure 13A:
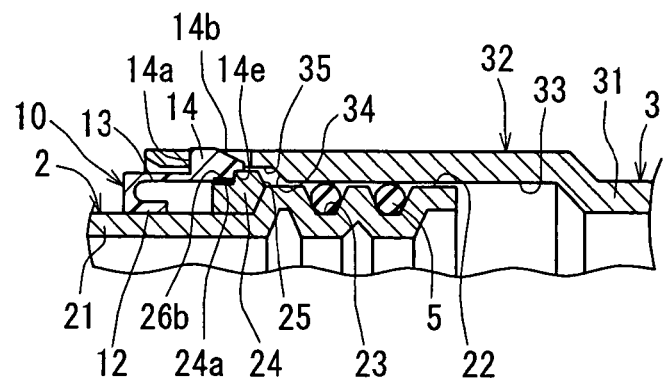
FIG. 13A is a cross-sectional view of a pipe joint structure according to a ninth embodiment of the present invention.

For example, the first engaged member 24 has a groove 26b along the circumference to receive the radially inner portions of the engagement portions 14. In other words, the first engaged member 24 has a tubular portion 26b having an outer diameter smaller than that of the other portion of the first engaged member 24. In FIG. 13A, numeral 24a denotes an outer surface of the tubular portion 26b, the outer surface contacting the radially inner surfaces of the engagement portions 14. The first engagement member/part 24 can have any shapes such as the shapes shown in FIGS. 13B to 13E, other than the cylindrical shape.

FIGS. 13B to 13E show examples of an external shape of the outer surface 24a when the tubular portion 26b is viewed from an axial end thereof.

Figure 13B:
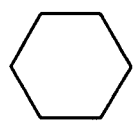
FIGS. 13B to 13E are schematic views for showing exemplary shapes of a first engagement surface step portion according to the ninth embodiment.

In the example shown in FIG. 13B, the outer surface 24a has a polygonal external form. In this case, the radially inner portions of the engagement portions 14 are formed into predetermined shape to correspond to the polygonal outer surface 24a.

Figure 13C:
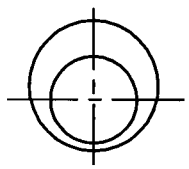

In the example shown in FIG. 13C, the outer surface 24a has an off-center cylindrical shape. In this case, the radially inner portions of the engagement portions 14 are formed into predetermined shape to correspond to the shape of the outer surface 24a.

Figure 13D:
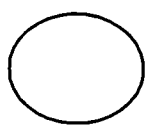

In the example shown in FIG. 13D, the outer surface 24a has a tubular shape having a non-perfect circular cross-section. For example, the outer surface 24a has an elliptic tubular shape. In this case, the radially inner portions of the engagement portions 14 are formed into predetermined shape to correspond to the shape of the outer surface 24a.

Figure 13E:
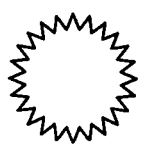

In the example shown in FIG. 13E, the outer surface 24a has projections and recesses in the radial direction. In this case, the radially inner portions of the engagement portions 14 are formed into predetermined shape to correspond to the shape of the outer surface 24a.

Accordingly, the rotation restricting structure can be provided by modifying the external form of the contact portion 24a and the radially inner portions of the engagement portions 24 as shown in FIGS. 13B to 13E.

Tenth Embodiment

A tenth embodiment will be described with reference to FIGS. 14A and 14B. In the above embodiments, the pipe joint structure is employed to couple the first and second pipe members 2, 3, which are the refrigerant pipes. However, the pipe joint structure is employed to couple a refrigerant pipe and a component device of a refrigerant cycle for a vehicle air conditioner, such as a heat exchanger, an expansion valve, and a receiver.

Figure 14A:
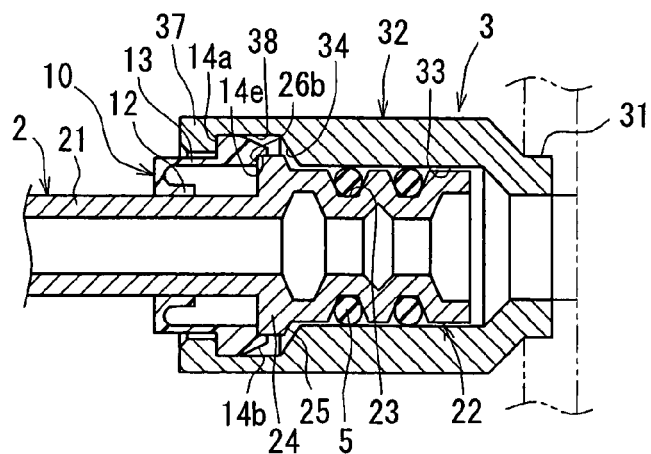
FIG. 14A is a schematic cross-sectional view of a pipe joint structure according to a tenth embodiment of the present invention.
Figure 14B:
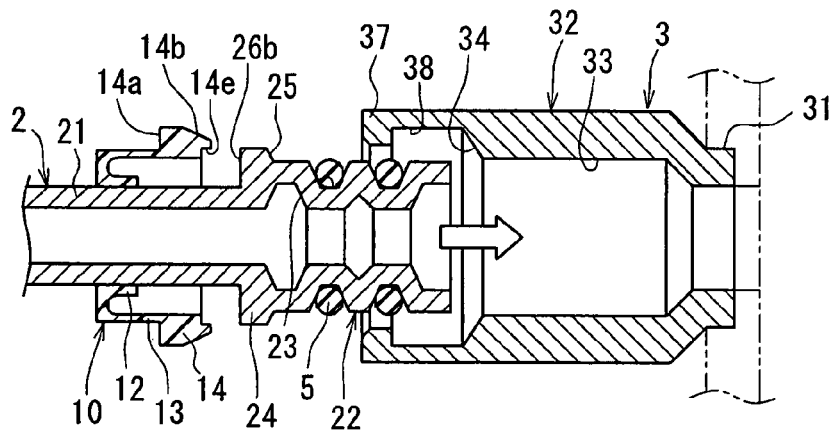
FIG. 14B is a schematic cross-sectional view of the pipe joint structure before a first pipe member and a second pipe member are engaged by a pipe joint according to the tenth embodiment.

For example, as shown in FIGS. 14A and 14B, an end of the second pipe member 3 is integrated with the component device shown by long and short dashed line. That is, the second pipe member 3 is provided as a connector portion of the component device through which the refrigerant flows in or out.

Specifically, the second pipe member 3 has the tubular pipe main portion 31 at the base portion of the female joint 32. The end of the pipe main portion 31 is connected to the component device to make communication with a refrigerant passage defined in the component device. The female joint 32 of the second pipe member 3 has the first portion defining the insertion opening 33, the second portion 37 and the intermediate portion 35 between the first and second portions. The intermediate portion 35 has the tapered inner surface 34 for receiving the tapered outer surface 25 of the first pipe member 2.

The second portion 37 have the radially inner step portions 38 (e.g., four) as the second engaged portion at locations opposing each other with respect to the axis. The radially inner step portions 38 provide grooves for receiving the engagement portions 14 of the pipe joint 10.

As shown in FIG. 14B, the pipe joint 10 is mounted to the first pipe member 2, and then the first pipe member 2 is inserted into the second pipe member 3. When the tapered outer surface 25 of the first engaged part 24 contacts the tapered inner surface 34 of the female joint 32, the engagement portions 14 of the pipe joint 10 are received in the grooves of the radially inner step portions 38.

Accordingly, similar to the above embodiments, the second contact portion 14a of the engagement portion 14 are engaged with the axial end of the radially inner step portions 38 and the first contact portions 14e are engaged with the first engaged part 24. Thus, the first and second pipe members 2, 3 are coupled using the pipe joint 10 by the one-touch operation.

Even when the second pipe member 3 is constructed as a portion of the component device or integrated with the component device, the pipe joint structures of the above first to ninth embodiments can be employed.

Figure 15:
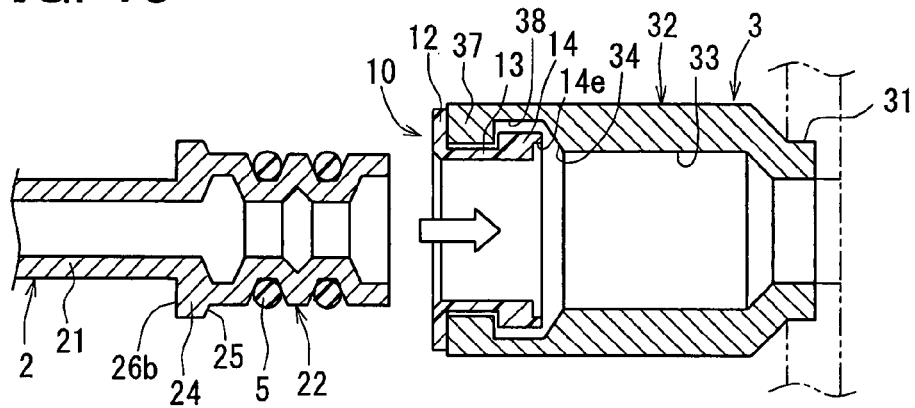
FIG. 15 is a schematic exploded cross-sectional view of the pipe joint structure for showing a modification of the pipe joint according to the tenth embodiment.

Further, the pipe joint 10 may be modified. As shown in FIG. 15, the pipe joint 10 can be attached to the second pipe member 3. In this case, the pipe joint 10 has the generally ring shape, similar to the sixth embodiment, and attached to the second pipe member 3 before the first pipe member 2 is inserted to the second pipe member 3. Thus, the pipe joint 10 is mounted to the space defined between the radially inside of the second portion 37 and the pipe main portion 21 of the first pipe member 2.

The pipe mounting portion 12 has a cap shape to cover the axial end of the second portion 37 and the radially inner surface of the second portion 37. The elastic displacing portions 13 and the engagement portions 14 have arc shapes along the circumference of the first pipe member 2. Accordingly, the pipe joint 10 has the external form similar to the second portion 37, similar to the above embodiments.

In the tenth embodiment, the pipe joint 10, the first engaged member/part 24 and the second engaged portion 38 may have any structures of those of the first to ninth embodiments.

Other Embodiments

The pipe joint structures of the above embodiments may be employed to couple first and second pipe members without having the male joint 22 and the female joint 32. Further, the pipe joint structure may be employed to couple any other pipe members, other than refrigerant pipes of the refrigerant cycle of the vehicle air conditioner. Thus, the fluid is not limited to the refrigerant. Further, the above embodiments may be practiced with various combinations.

The example embodiments of the present invention are described above. However, the present invention is not limited to the above example embodiment, but may be implemented in other ways without departing from the spirit of the invention.

What is claimed is:

1. A pipe joint for connecting a first pipe member and a second pipe member such that a portion of the first pipe member is disposed inside of a portion of the second pipe member, the first pipe member and the second pipe member including a first engaged part and a second engaged part, respectively, the pipe joint comprising:
    a pipe mounting portion capable of mounting to one of the first and second pipe member;
    an engagement portion including a first contact portion for contacting the first engaged part of the first pipe member and second contact portion for contacting the second engaged part of the second pipe member, the engagement portion capable of being disposed in the portion of the second pipe member for engaging with the first pipe member and the second pipe member; and
    an elastic displacing portion connecting the pipe mounting portion and the engagement portion, the elastic displacing portion supporting the engagement portion to allow displacement of the engagement portion with respect to a radial direction of the second pipe member; wherein
    the first contact portion is a step portion that is provided at the tip end of the engagement portion; and
    the first contact portion engages a groove defined by the first engaged part in a radial direction.

2. The pipe joint according to claim 1, wherein
    the pipe mounting portion has a substantially tubular shape having a slit, and is deformable in a radial direction of the tubular shape.

3. The pipe joint according to claim 1, wherein
    the pipe mounting portion has a cap shape to be attached to an end of the portion of the second pipe member.

4. The pipe joint according to claim 1, wherein
    the engagement portion has modulus of elasticity higher than modulus of elasticity of the pipe mounting portion and the elastic displacing portion.

5. The pipe joint according to claim 1, wherein the engagement portion has a thickness greater than a thickness of the pipe mounting portion and the elastic displacing portion with respect to the radial direction.

6. The pipe joint according to claim 1, wherein the elastic displacing portion includes a radially extending wall extending from the pipe mounting portion in the radial direction and an axially extending wall extending from the radially extending wall in an axial direction.

7. The pipe joint according to claim 1, wherein the engagement portion has the first contact portion and the second contact portion at opposite ends thereof with respect to an axial direction.

8. The pipe joint according to claim 1, wherein the pipe mounting portion, the elastic displacing portion and the engagement portion are integrally formed.

9. The pipe joint structure according to claim 1, wherein the first pipe member has a stopper portion on its outer periphery for receiving an axial end of the pipe joint on a side opposite to the first engaged part.

10. A method of coupling the first pipe member and the second pipe member using the pipe joint according to claim 1, the method comprising:
mounting the pipe mounting portion of the pipe joint to the first pipe member;
placing the portion of the first pipe member into the portion of the second pipe member until a tapered outer surface of the first engagement part of the first pipe member is brought into contact with a tapered inner surface of the second pipe member, and
moving the first pipe member in a direction away from the second pipe member to engage a radial inner side of the engagement portion with the first engaged part;
the placing step includes: inserting the engagement portion of the pipe joint into the portion of the second pipe member while displacing the engagement portion in a radially inward direction along a radially inner surface of the portion of the second pipe member; and entering the engagement portion into the second engaged part of the second pipe member in a radially outward direction due to spring back after the inserting.

11. The method according to claim 10, wherein:
the moving step moves the first pipe member in the direction away from the second pipe member such that the first contact portion of the engagement portion is engaged with the first engaged part of the first pipe member and the second contact portion of the engagement portion is engaged with the second engaged part of the second pipe member in an axial direction.

12. The method according to claim 11, wherein
the moving step includes sliding the first engaged part relative to the engagement portion such that the engagement portion engages with the first engaged part in the radial direction.

13. The method according to claim 10, further comprising:
filling the first and second pipe members with a fluid, wherein:
the moving step is caused by an increase in an internal pressure due to the fluid.

14. The pipe joint according to claim 1, wherein the first contact portion is a plurality of step portions, each step portion engaging one of a plurality of grooves defined by the first engaged part of the first pipe member.

15. The pipe joint according to claim 14, wherein the second contact portion is a plurality of radial surfaces, each radial surface engaging one of a plurality of radial surfaces defined by the second engaged part of the second pipe member.

16. The pipe joint according to claim 15, wherein the engagement of each step portion with the one of the plurality of grooves and the engagement of each radial surface of the second contact portion with the one of the radial surfaces defined by the second engaged part prevents rotation of the first pipe member with respect to the second pipe member.

17. The pipe joint according to claim 1, wherein an inner circumferential surface of said step portion is disposed over the first engaged part.

18. The pipe joint according to claim 1, wherein displacement of the engagement portion with respect to the radial direction of the second pipe member moves both the first contact portion and the second contact portion radially inward with respect to the radial direction of the second pipe.

19. A pipe joint structure comprising:
a first pipe member having a first engaged part on its outer periphery;
a second pipe member including a pipe main portion and an extension portion that extends from the pipe main portion, the extension portion disposed radially outside of the first pipe member and having a second engaged part; and
a pipe joint engaging with the first and second pipe members for coupling the first and second pipe members, wherein
the pipe joint includes a pipe mounting portion, an elastic displacing portion that extends from the pipe mounting portion and an engagement portion that extends from the elastic displacing portion,
the pipe mounting portion is mounted to one of the first and second pipe members,
the elastic displacing portion supports the engagement portion in a radially inner side of the extension portion of the second pipe member,
the engagement portion has a first contact portion contacting the first engaged part of the first pipe member and a second contact portion contacting the second engaged part of the second pipe member; and
a radial inner side of the engagement portion engages the first engaged part to prevent displacement of the engagement portion in a radial inward direction, wherein the pipe mounting portion has a substantially tubular shape having a slit, and is mounted on a radially outer surface of the first pipe member.

20. The pipe joint structure according to claim 19, wherein the pipe mounting portion has a cap shape and mounted to an end of the extension portion of the second pipe member.

21. The pipe joint structure according to claim 19, wherein the engagement portion has modulus of elasticity higher than modulus of elasticity of the pipe mounting portion and the elastic displacing portion.

22. The pipe joint structure according to claim 19, wherein the engagement portion has a thickness greater than a thickness of the pipe mounting portion and the elastic displacing portion with respect to the radial direction.

23. The pipe joint structure according to claim 19, wherein the elastic displacing portion includes a radially extending portion extending from the pipe mounting portion in the radial direction and an axially extending portion extending from the radially extending portion in an axial direction.

24. The pipe joint structure according to claim 19, wherein the first contact portion and the second contact portion of the pipe joint are respectively engaged with the first engaged part of the first pipe member and the second engaged part of the second pipe member in an axial direction.

25. The pipe joint according to claim 19, wherein a part of the first pipe member is radially expanded to define a pipe expanded portion, the first engaged part is provided by the pipe expanded portion.

26. A pipe joint structure comprising:

a first pipe member having a first engaged part on its outer periphery;

a second pipe member including a pipe main portion and an extension portion that extends from the pipe main portion, the extension portion disposed radially outside of the first pipe member and having a second engaged part; and a pipe joint engaging with the first and second pipe members for coupling the first and second pipe members, wherein the pipe joint includes a pipe mounting portion, an elastic displacing portion that extends from the pipe mounting portion and an engagement portion that extends from the elastic displacing portion, the pipe mounting portion is mounted to one of the first and second pipe members, the elastic displacing portion supports the engagement portion in a radially inner side of the extension portion of the second pipe member, the engagement portion has a first contact portion contacting the first engaged part of the first pipe member and a second contact portion contacting the second engaged part of the second pipe member; and the pipe joint and the first engaged part of the first pipe member provide a rotation restricting structure at a position where the engagement portion is engaged with the first engaged part for restricting rotation of the first and second pipe members in a circumferential direction thereof.

27. The pipe joint structure according to claim 26, wherein the first engaged part includes a first engagement surface step portion at a predetermined position, and the engagement portion of the pipe joint has a second engagement surface step portion to correspond to the first engagement surface step portion, and the rotation restricting structure is provided by engagement of the first engagement surface step portion and the second engagement surface step portion.

28. The pipe joint structure according to claim 26, wherein the first pipe member includes a pipe main portion, the first engaged part has a substantially cylindrical shape and is fixed to an outer periphery of the pipe main portion of the first pipe member.

29. The pipe joint structure according to claim 26, wherein the first pipe member includes a pipe main portion and a male joint at an end of the pipe main portion, the pipe main portion has an expansion at the end thereof, and the first engaged part is provided by the expansion.

30. The pipe joint structure according to claim 26, wherein the first engaged part has a tubular portion as a first engagement surface step portion, the tubular portion has an external shape one of a polygonal shape, an off-center circular shape, a non-perfect circular shape, zigzag shape, the engagement portion of the pipe joint has a radially inner portion that contacts the tubular portion of the first engaged part as a second engagement surface step portion, and the radially inner portion has a shape corresponding to the external shape of the tubular portion of the first engaged part.

* * * * *